United States Patent
Lauri et al.

(10) Patent No.: US 8,251,871 B2
(45) Date of Patent: Aug. 28, 2012

(54) METHOD FOR OPERATING AN AUTOMATIC OR SEMI-AUTOMATIC TRANSMISSION OF A HEAVY VEHICLE WHEN IN IDLE-DRIVING MODE

(75) Inventors: Erik Lauri, Mölndal (SE); Fredrik Karpenman, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 435 days.

(21) Appl. No.: 12/528,803

(22) PCT Filed: Feb. 27, 2007

(86) PCT No.: PCT/SE2007/000182
§ 371 (c)(1),
(2), (4) Date: Feb. 1, 2010

(87) PCT Pub. No.: WO2008/105688
PCT Pub. Date: Sep. 4, 2008

(65) Prior Publication Data
US 2010/0234177 A1    Sep. 16, 2010

(51) Int. Cl.
*B60W 10/04* (2006.01)
*G06F 7/00* (2006.01)
(52) U.S. Cl. .......................................... 477/108; 701/52
(58) Field of Classification Search ................ 477/107, 477/108, 111, 115; 701/52
See application file for complete search history.

(56) References Cited

U.S. PATENT DOCUMENTS

| | | | |
|---|---|---|---|
| 4,838,397 A | 6/1989 | Kurihara et al. | |
| 5,393,278 A | 2/1995 | Kyushima et al. | |
| 5,577,978 A * | 11/1996 | Stasik et al. | 477/78 |
| 5,664,458 A * | 9/1997 | Stasik et al. | 74/336 R |
| 5,863,277 A | 1/1999 | Melbourne | |
| 5,989,153 A | 11/1999 | Fischer et al. | |
| 7,160,223 B2 * | 1/2007 | Colvin | 477/3 |
| 2003/0100401 A1 | 5/2003 | Kim | |

(Continued)

FOREIGN PATENT DOCUMENTS
FR    2875202 A1    3/2006
(Continued)

OTHER PUBLICATIONS

International Search Report for corresponding International Application PCT/SE2007/000182.

(Continued)

*Primary Examiner* — Roger Pang
(74) *Attorney, Agent, or Firm* — WRB-IP LLP

(57) ABSTRACT

A method for operating a semi-automatic or automatic mechanical transmission of a heavy truck when driving at idle speed is provided. The method includes supplying fuel to the engine of the heavy truck at a rate that facilitates engine-idle operation. In another step, the method engages the automatic or semi-automatic transmission in a gear higher than the starting gear of the transmission and permits the truck to operate at a first substantially uniform driving velocity under engine-idle power. Depending upon traffic and environmental requirements which require a higher speed, the driver upshifts the semi-automatic or automatic transmission by depressing a control device for manual gear selection arranged on a gear shift lever of the truck and then drives the truck at a second substantially uniform driving velocity under engine-idle power. The second substantially uniform driving velocity is greater than the first substantially uniform driving velocity.

11 Claims, 4 Drawing Sheets

U.S. PATENT DOCUMENTS

2005/0221950 A1    10/2005    Eriksson
2010/0063697 A1*   3/2010    Lindgren et al. ................ 701/59

FOREIGN PATENT DOCUMENTS

WO      0242108  A1    5/2002
WO    2006119865 A1   11/2006

OTHER PUBLICATIONS

Patent Abstracts of Japan JP 63-242733 A (Aichi Machine Ind) Oct. 7, 1988.
Supplementary European Search Report for corresponding European App. EP 07 70 9388.

* cited by examiner

METHOD FOR OPERATING AN AUTOMATIC OR SEMI-AUTOMATIC TRANSMISSION OF A HEAVY VEHICLE WHEN IN IDLE-DRIVING MODE

BACKGROUND AND SUMMARY

The present invention relates to commercial vehicles; and more particularly to drivetrain control strategies for such vehicles as heavy trucks, buses and the like.

In the course of driving heavy vehicles such as overland trucks and buses (which should be considered interchangeable for purposes of the description contained herein), it is common to be required to drive at relatively slow speeds, often for extended periods of time. Exemplary situations are driving in slow, backed up traffic and maneuvering about loading yards where high-speed travel is not possible. In modern heavy vehicles, it is common to find that such vehicles are equipped with a semi-automatic transmission or an automatic mechanical transmission (AMT) or a power-shifting automatic transmission. In any of the above cases, computer control strategies are utilized in the selection of gear engagements, as well as transition strategies between the different gear choices of the transmission. Furthermore, in a stepped transmission some gearwheels and shafts that are used for torque transfer in different gears are rotationally fixed to each other by means of connecting devices, for instance clutches, hi a positive connecting device, such as a dog clutch, the torque is transferred substantially by normal forces, as opposed to a frictional connecting device, such as a plate clutch, where the torque is transferred substantially by friction forces. The difference between the different types of available stepped transmissions can be described as the operation of clutch, gear selection, and carrying out the gear selection, hi an automatic mechanical transmission the operation of the clutch, gear selection and the carrying out of the gear selection is performed automatically without driver intervention. A manual transmission requires the driver to perform the operation of the clutch, gear selection and the carrying out of the gear selection. Manual transmissions are typically of the mechanically engaged type in general. A semi-automatic transmission is one in which one or more of the operation of the clutch, gear selection, or carrying out gear selection is performed by the driver of the truck. The semi-automatic transmission may also be of the mechanical type transmission. In a transmission of the mechanically engaged type, there are positive connecting devices. During a gear shift, there will normally be an interruption of the torque transfer in a transmission of the mechanically engaged type. Frictional connecting devices are mainly found in power-shifting transmission, where torque is also transferred during a gear shift. Power-shifting transmissions are usually automatic or semi-automatic. Automatic transmissions of the mechanically engaged type are referred to as automatic mechanical transmissions. Such a transmission may use a manual transmission with controllers to automate the operation of the transmission. It may also be specifically designed to be automatic and not based on a manual transmission. Hereinafter, the automatic mechanical transmission and power-shifting automatic transmission are referred to as an automatic transmission.

Referring to the situations in which it is desired that the heavy vehicle moves slowly but substantially constantly on course, operators have developed habits for engaging an appropriate low gear which carries the vehicle forward or backward under the power of the idling engine. Thus, the driver of the vehicle is idle driving, i.e. without pressing an accelerator pedal, or any other drive torque controlling device, arranged in the vehicle. Depending upon the desired speed and the heavy vehicle load, among other factors, different low gears are selectable.

The low gears available for selection, however, are limited by the torque that can be developed in each gear by the engine operating at the preset idle speed, and the range of gears available for use at any particular time will be determined by conditions of the vehicle, as well as conditions of the environment within which the vehicle is operating. The two primary conditions upon which the range of available gears is dependent is the mass of the vehicle (including any load) and ground inclination. Dependent at least in part on each of these two characteristics, the highest gear of the transmission can be determined at which the idling engine can maintain a substantially constant speed of the vehicle without losing speed because of insufficient torque capability. Heretofore, drivers have been left to draw on their experience for selecting an initial gear for such idle travel, with adjustments being made up or down in order to engage the gear which produces the desired travel speed, and which is also capable of maintaining that speed using the torque developed at the preset idle speed of the engine, for example, 650 revolutions per minute.

It is appreciated that if presently existing conditions are known which bear upon the highest gear selection at which the idling engine can maintain a constant vehicle speed, that gear can be determined, engaged and utilized for powering travel of the vehicle. Often times, however, the gear ratio carries the vehicle at a groundspeed slower than desired. For instance, the traffic speed within which the heavy truck is operating maybe faster than this speed which the idling engine can maintain under existing conditions. Heretofore, as described above, selection of the proper gear which permits the engine to operate at idle and produce the desired higher speed of the vehicle was performed by the driver himself based on past experience and trial-and-error with respect to selection within a typical low range of gears and the selection of accelerator pedal position to achieve the right vehicle acceleration and finally the right vehicle speed.

This type of trial-and-error, hunt-and-peck of gear selection and accelerator pedal position by the driver obviously has drawbacks; among others, if the truck is operating under slow speed conditions, the driver can become unnecessarily fatigued by the selection process. Still further, operating economy can suffer not only because of inefficiencies associated with constant gear changing and adjustments of the accelerator pedal position, but also if the optimal gear is not selected which can use the preset idle speed of the engine for maintaining the desired vehicle speed. Therefore, the need has been recognized for a drivetrain control system in which such gear selections and selection of accelerator pedal position are made on at least a semi-automated basis with only minimal or no direct selection input from the driver.

In at least one embodiment, the present invention takes the form of a method for operating a semi-automatic or automatic transmission of a heavy vehicle when driving at idle speed. The method according to the invention comprises (includes, but is not necessarily limited to) supplying fuel to the engine of the heavy truck at a rate that facilitates engine-idle operation. In another step, the method engages the semi-automatic or automatic transmission in a gear higher than the starting gear of the transmission and permits the vehicle to operate at a first substantially uniform driving velocity under engine-idle power. Depending upon traffic and environmental requirements which require a faster speed, the driver upshifts the semi-automatic or automatic transmission by manually controlling a control device for manual gear selection and then drives the vehicle at a second substantially uniform driving velocity under engine-idle power. Necessarily, the second substantially uniform driving velocity is higher than the first substantially uniform driving velocity. The method according to the invention gives an increased driving comfort and fuel savings. The method also decreases unnecessary clutch slip.

In another embodiment of the invention by controlling the engine speed of the vehicle the engine speed is automatically increased up to a predetermined vehicle speed before the upshift is performed. In still another embodiment the speed of the vehicle is automatically increased after the upshift by reengaging the clutch. Thus synchronization of engine idling speed to the new gear is performed by the clutch, m another embodiment the speed of the vehicle is increased by performing a combination of engine control and clutch control, hi still another embodiment the vehicle speed increase is dependent of and adapted to current vehicle travel resistance. The upshift function according to the invention could also only be available when travel resistance of said vehicle is below a predetermined value. This could also include predicted future travel resistance. In another embodiment of the invention the manual driver control of the control device causes the transmission to upshift one gear, and in still another embodiment a longer manual control (such as e.g. depression) of the control device can cause the transmission to upshift at least two gears. In still another embodiment of the invention a certain number of manual control actions of the control device cause the transmission to upshift corresponding number of gear steps.

Further advantageous embodiments of the invention emerge from the following description.

BRIEF DESCRIPTION OF THE DRAWINGS

The present invention will now be more fully described, by way of example, with reference to the accompanying drawing in which.

DETAILED DESCRIPTION

Figure 1:
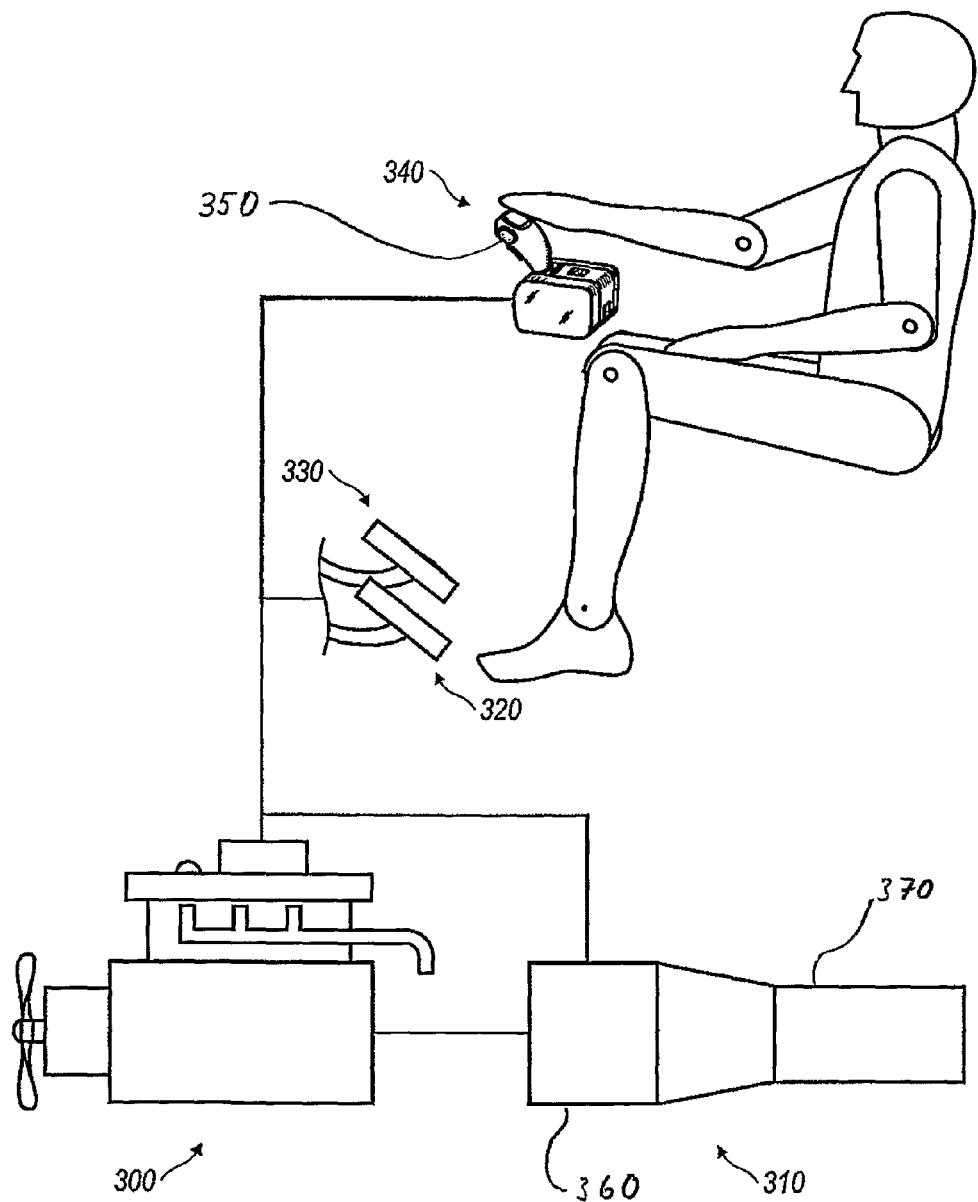
FIG. 1 is a diagram showing the connection of the control device on a gear shift lever to the engine and transmission.

In such commercial vehicles as heavy trucks and buses, it is common to have computer-controlled subsystems. Among others, those subsystems typically include at least the engine 300, and now transmission 310, to greater or lesser extents as shown in FIG. 1. With the introduction of computer-based control systems for the engine 300 and transmission 310, and the capability for the exchange of information therebetween, it is now possible to automate coordination between the two subsystems for such benefits as fuel economy and acceleration, as well as driver comfort and drivability. Using such computer-based control systems, driver fatigue can be substantially reduced, as well as facilitate a less experienced operator's near expert control of the vehicle. In below shown embodiments of the invention said transmission 310 comprises a clutch 360 and a gearbox 370. A gear shift lever 340 enables the driver to select an appropriate drive mode including but not limited to automatic, manual, and low. The manual mode enables the driver to make a manual gear selection through a control device 350 for manual gear selection arranged on the gear shift lever 340. This control device 350 is in FIG. 1 shown as a toggle switch with a plus and minus end for selecting upshifts and downshifts respectively. The control device 350 could also be in the form of separated plus/minus buttons or a scroll. The control device 350 could also be a lever or joystick arranged somewhere near the driver, e.g. by the steering wheel, by the gear shift lever or by a driver's seat.

As described hereinabove, driving conditions often exist in which it is desirable that the vehicle be driven at a substantially constant speed, albeit, a relatively slow speed in such conditions as heavy traffic or load yard maneuvering. The need for such slow speed travel can be either forward or reverse, though the need for a greater selection of forward speeds is appreciated.

In a heavy vehicle, such as an overland truck powered by a prime mover 300, a preset idle speed is typically programmed in the engine control strategy. The prime mover preferably is a diesel engine, but can include other devices designed to propel the vehicle such as an electric motor, gasoline engine or hybrid engine combining two or more of the above mentioned devices. As those persons skilled in the art will appreciate regarding a standard torque curve, the engine, at this idle speed will have a maximum torque capability. Variable characteristics of the vehicle bear upon its resistance to travel, as do varying road conditions. While there are several variables within each category (vehicle versus environment) that can influence vehicle travel resistance, the two primary variables are vehicle mass and ground inclination. Both of these characteristics are presently able to be quantified in suitably equipped vehicles, and therefore these variables become known inputs for calculations and gear selections made according to the present invention.

A typical and exemplary situation in which a driver desires to increase the speed of an idle engine speed travel condition is when the high traffic driving pattern around the vehicle is increasing its speed. When such a situation is foreseen by a driver, the initial reaction is to press an accelerator pedal 330 (put their foot on the gas) and begin to accelerate in order to trying to match the faster traffic pattern or zone. According to the current invention the driver will not need to accelerate the vehicle by pressing the accelerator pedal. With the current invention the driver would only have to press the plus end of the control device 350 for manual selection of a higher gear. The pressing of the control device 350 and the vehicle being in an idle driving condition initiates a control unit in the vehicle to select (if possible) a higher idle driving gear and see to that the vehicle is automatically accelerated to a new higher idle driving speed and that the new higher gear is engaged so that the vehicle can continue travel with the new idle driving speed.

Figure 2:
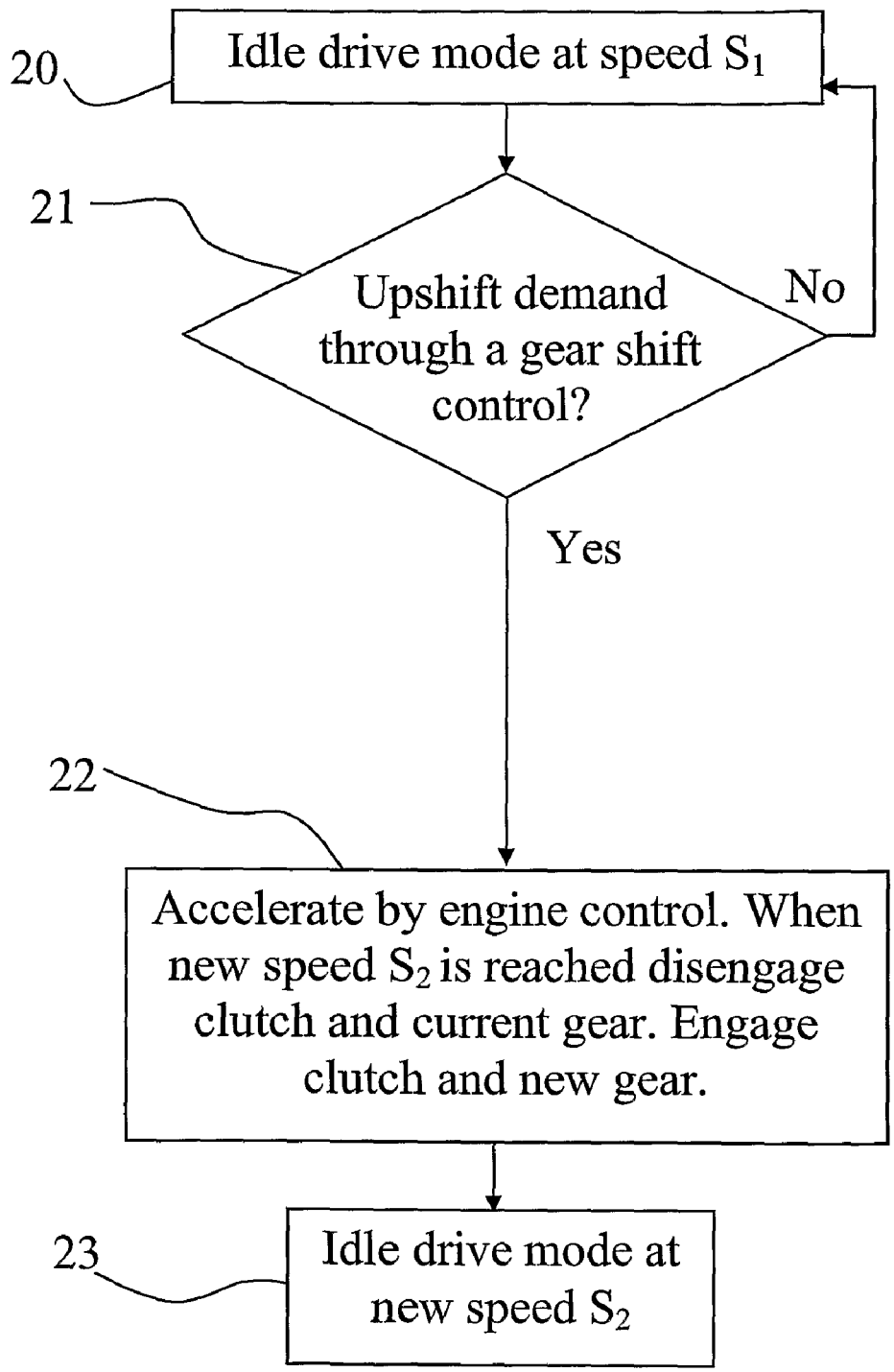
FIG. 2 illustrates a flow diagram of one method of upshifting a semi-automatic or automatic transmission in idle drive mode according to the invention.

FIG. 2 discloses a preferred embodiment according to the invention where the control unit in a first step 20 is controlling the vehicle to drive in a first vehicle idle speed 51. Thus, the vehicle is driven forward without the driver depressing the accelerator pedal 330 nor a brake pedal 320 in the vehicle. In step 21 the control unit is programmed to sense if the driver of the vehicle is demanding an upshift by depressing the plus end of said control device 350 for manual gear selection. If "No", the control unit continues to drive with current gear engaged and idle speed 51, according to step 10 in FIG. 2. If "Yes", i.e. if the driver demands an idle speed increase by depressing said control device 350, the control unit is then programmed to increase output torque from the engine 300 in order to accelerate the vehicle speed to a new speed S2 correspondent to a rotational speed in the gearbox 370 for the next higher gear selected to be engaged and which would be substantially synchronous with the engine idle speed when engaged. This is indicated by step 22 in FIG. 2. The acceleration of the vehicle to the higher speed S2 can be controlled in a very optimized way, compared to if the driver would control the vehicle acceleration manually by pressing the accelerator pedal. An optimized acceleration saves fuel. When the new speed S2 has been reached the control unit is programmed to disengage the clutch 360 arranged between the engine 300 and gearbox 370. The clutch 360 is for transmitting engine torque from the engine to the gearbox and driven wheels of the vehicle rotatably fixed connected thereto. When the new higher gear has been engaged, the clutch is reengaged so that driving torque can be transmitted and driving can be performed with the new speed S2. In step 23 the new gear is engaged, the clutch is reengaged and torque output from the engine is controlled so that the new speed S2 will is maintained.

Figure 3:
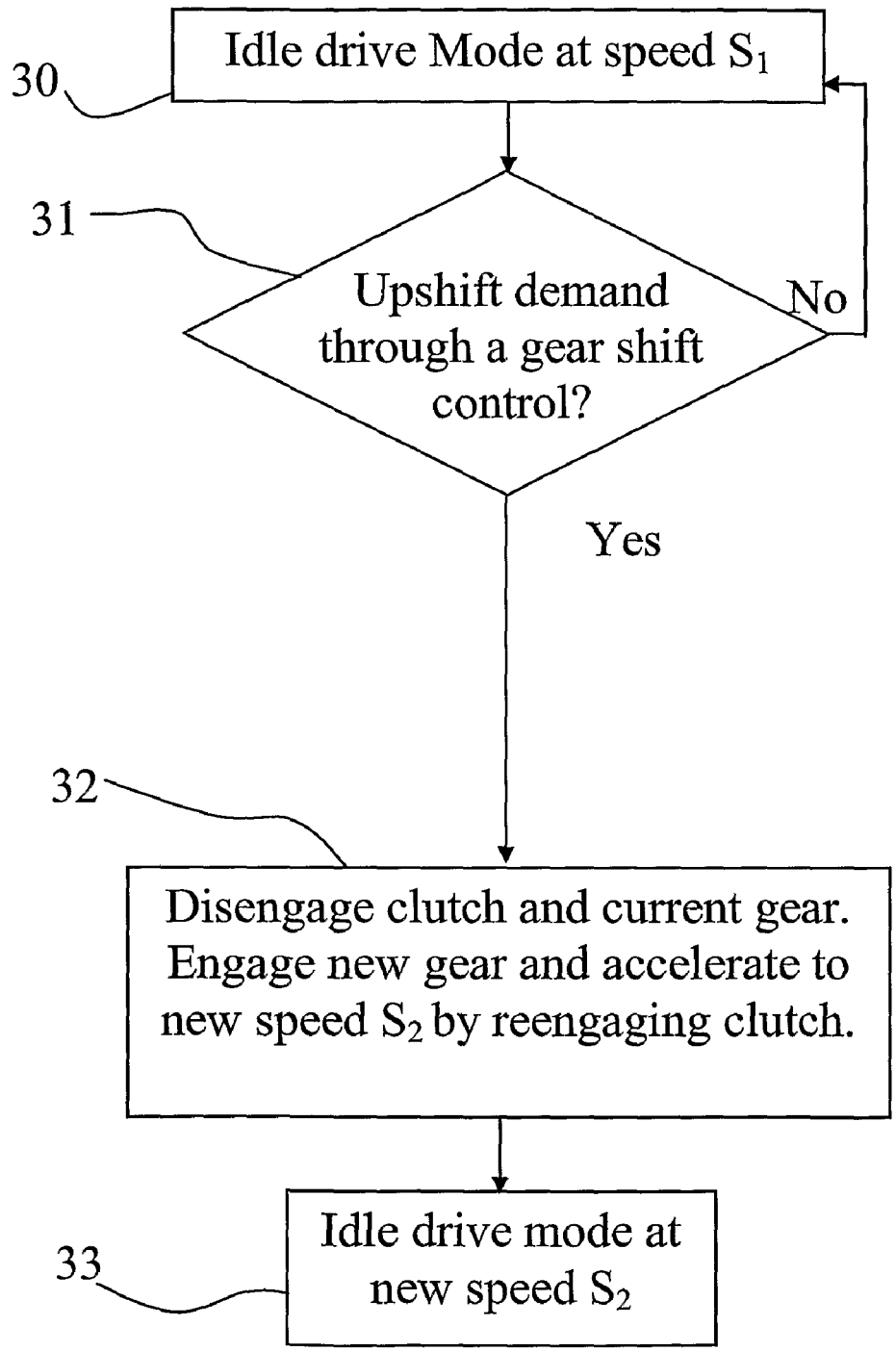
FIG. 3 illustrates a flow diagram of one method of upshifting a semi-automatic or automatic transmission in idle drive mode according to a second embodiment of the invention.

FIG. 3 shows another embodiment of the invention. Steps 30, 31 and 33 are identical to the corresponding steps of the embodiment in FIG. 2. In step 32 the control unit is programmed to disengage the clutch and the currently engaged gear in the gearbox without accelerating the vehicle with the engine. The control unit engages the new higher gear in the gearbox and then accelerates the vehicle to speed S2 by reengaging the clutch. The difference in rotational speed between engine idle speed and the rotational speed of the new gear is synchronized through the engagement of the clutch. The control of engine output torque during the clutch engagement is optimized and matched to prevailing vehicle travel resistance so the engine at least holds idle driving rotational speed. Also the control of the clutch engagement as such is matched to the prevailing vehicle travel resistance. The clutch engagement according to the embodiment in FIG. 3 tends to be slower, i.e. takes more time, compared to the clutch engagement according to the embodiment in FIG. 2. A slower or softer clutch engagement gives better comfort for the embodiment in FIG. 3.

Figure 4:
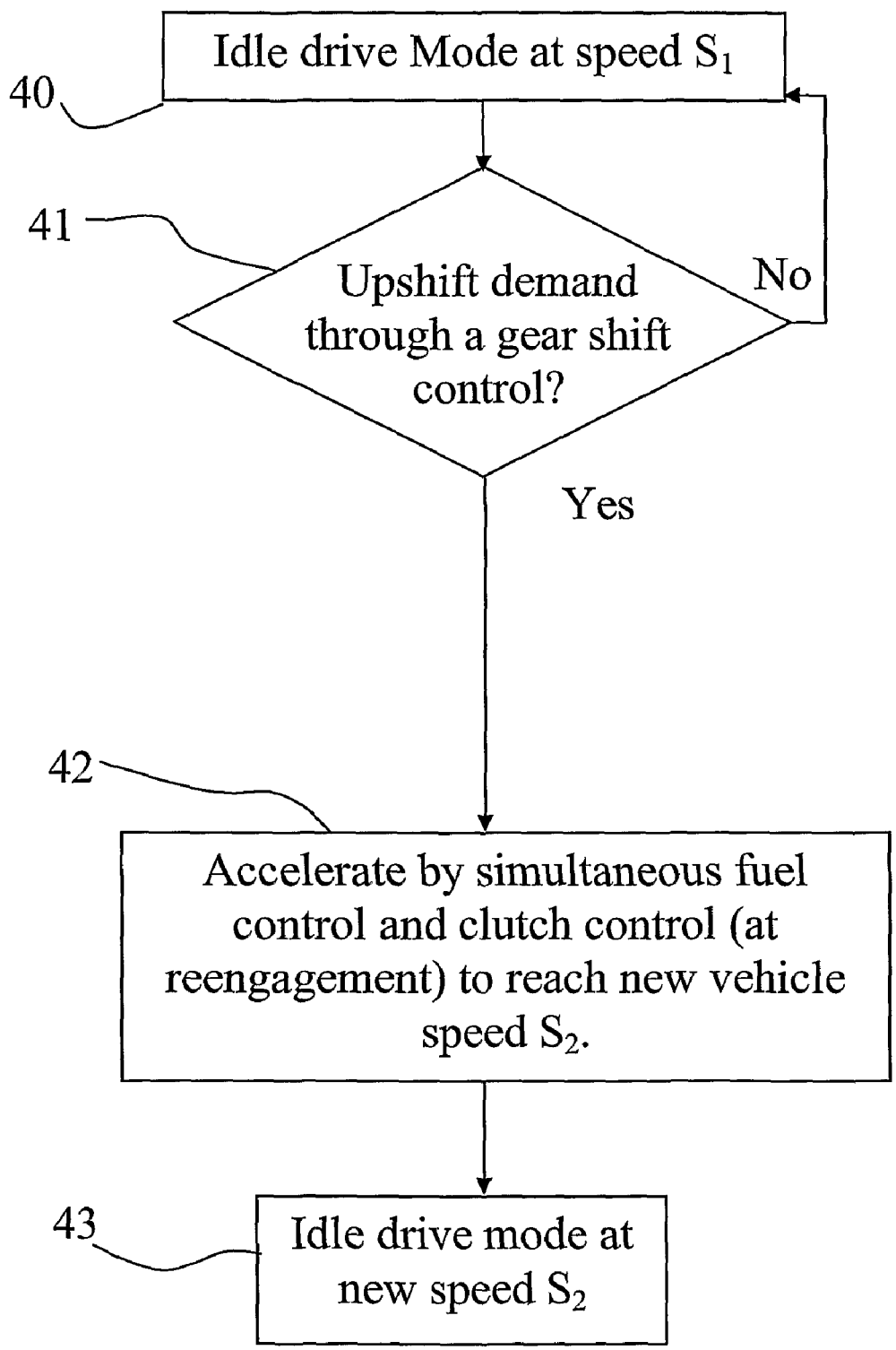
FIG. 4 illustrates a flow diagram of one method of upshifting a semi-automatic or automatic transmission in idle drive mode according to a third embodiment of the invention.

FIG. 4 shows another embodiment of the invention. Steps 40, 41 and 43 are identical to the corresponding steps of the embodiment in FIG. 2. In step 42 the control unit is programmed to first increase output torque from the engine 300 in order to accelerate the vehicle speed to a speed intermediate of S1 and S2 and closer to target speed S2 (idle driving speed for the new higher gear). When the intermediate speed is reached the control unit initiates a clutch disengagement and gear disengagement. The control unit then engages the new higher gear and accelerates the vehicle to speed S2 by reengaging the clutch. Thus, the last difference in rotational speed between engine idle speed and the rotational speed of the new higher gear is synchronized through the reengagement of the clutch.

In a preferred embodiment of the invention the control unit is also programmed to first check if the vehicle will be able to travel at a new higher idle driving speed. Preferably this is done by checking at least current vehicle travel resistance. In a preferred embodiment the control unit could be programmed to predict future vehicle travel resistance. This can be done by known technique, such as GPS-device combined with electronic maps or different interpolation methods. The control unit can also be programmed to use current or current and future predicted vehicle travel resistance to optimize the increase in rotational engine speed before upshift to the new higher gear. This is especially applicable to the embodiments shown in FIGS. 2 and 4.

Another preferred embodiment is a method to cause the transmission to engage in multiple upshifts. The depression or control of the control device 350 to cause upshifts can be performed through several different methods, and two embodiments are described below. If the control device 350 is continually depressed it will trigger an upshift command to be issued to the transmission, and upshifts with corresponding vehicle acceleration will continue to occur until the point in which the transmission has upshifted to the highest gear at which idle drive is possible. Another embodiment is where the control device 350 is bump-pressed and then released and bump-pressed again. For each of these bump-press procedures the transmission will be upshifted and the vehicle accelerated to a higher idle driving speed. This procedure can be repeated until it reaches the highest gear at which idle drive is possible. Thus, the bump-press on the control device 350 effectively works to interrupt the normal automation of the transmission and to provide for driver control of the upshift. This allowed when the vehicle is operating in the idle-driving mode.

A natural and frequent occurrence is that the need for relatively slow idle driving travel eventually ceases and the operator desires to accelerate the vehicle up to a higher travel speed. In order to do so, the accelerator pedal 330 is depressed, and depending upon the degree to which the pedal is depressed, normal transmission programming would cause a downshift for increased torque production at a higher engine speed. For certain reasons such as driver comfort and economy, it is desired that such downshifting be prohibited as the vehicle pulls out of the idle speed travel mode and the same gear engagement at which idle travel was taking place be maintained. As the vehicle gains speed, the regular driving transmission control strategies resume operation.

If the driver needs to stop or slow down the vehicle when idle driving the idle driving condition will cease when the brake pedal 320 is depressed. As the vehicle speed slows down, the regular driving transmission control strategies resume operation.

In the manner described hereinabove, computer-based transmission control facilitates easier and more efficient idle speed driving of a heavy commercial vehicle, as well as gives the operator an easy-to-use procedure for incrementally increasing idle speed travel once established, and accommodating a smooth economical return to normal road speed travel.

The invention should not be deemed to be limited to the embodiments described above, but rather a number of further variants and modifications are conceivable within the scope of the following patent claims.

What is claimed is:
1. A method for operating an automatic or semi-automatic transmission of a heavy vehicle when in idle-driving mode, the method comprising:
  supplying fuel to an engine of the heavy vehicle at a rate that facilitates engine-idle operation;
  engaging the transmission in a gear higher than the starting gear of the transmission and permitting the heavy vehicle to operate at a first substantially uniform driving velocity under engine-idle power; and
  upshifting the transmission by manual control of a control device for manual gear selection and then driving the heavy vehicle at a second substantially uniform driving velocity under engine-idle power, wherein the second substantially uniform driving velocity is higher than the first substantially uniform driving velocity.

2. The method as recited in claim 1, wherein the control device is a toggle switch, button, lever, joystick or scroll.

3. The method as recited in claim 1, wherein speed of the vehicle is automatically increased up to a predetermined vehicle speed before the upshift is performed by controlling the engine.

4. The method as recited in claim 1, wherein speed of the vehicle is automatically increased after the upshift by reengaging a clutch, the clutch being part of the transmission and being arranged between the engine and a gearbox of the transmission.

5. The method as recited in claim 1, wherein the speed of the vehicle is automatically increased by performing by at least one of controlling the engine and reengaging a clutch.

6. The method as recited in claim 5, wherein the vehicle speed increase is dependent of and adapted to current vehicle travel resistance.

7. The method as recited in claim 1, wherein the upshift function is only available when travel resistance of the vehicle is below a predetermined value.

8. The method as recited in claim 1, wherein the manual control of the control device causes the transmission to upshift one gear step.

9. The method as recited in claim 1, wherein a longer manual control action of the control device causes the transmission to upshift at least two gears steps.

10. The method as recited in claim 1, wherein a certain number of manual control actions of the control device causes the transmission to upshift corresponding number of gear steps.

11. The method as recited in claim 1, wherein the control device is arranged on a gear shift lever.

* * * * *